No. 728,566. Patented May 19, 1903.

UNITED STATES PATENT OFFICE.

CLAUDE D. GROVE, OF COLORADO SPRINGS, COLORADO.

PROCESS OF RECOVERING BROMIN.

SPECIFICATION forming part of Letters Patent No. 728,566, dated May 19, 1903.

Application filed January 9, 1903. Serial No. 138,416. (No specimens.)

*To all whom it may concern:*

Be it known that I, CLAUDE D. GROVE, a citizen of the United States, residing at Colorado Springs, in the county of El Paso, State of Colorado, have invented certain new and useful Improvements in Processes of Recovering Bromin in the Bromination Process of Treating Ores, of which the following is a description.

My invention relates to an improvement in processes for treating refractory ores, and particularly to a novel method of recovering bromin used in the bromination process of treating ores by the conversion of the bromates into bromids.

In the treatment of ores by solutions of bromin, whether in conjunction with chlorin or not, which treatment is usually carried out in acid solutions, there is usually a large excess of the bromates, and this has heretofore been lost.

In the treatment of the solution by chlorin for the liberation of the bromin an excess of chlorin is necessary and there is a considerable conversion of the bromid into a bromate, thereby occasioning another great loss in bromin, which it is a further object of the present invention to avoid. The prior state of the art and the reason why such loss is experienced, as above mentioned, will be hereinafter referred to and the application of my present invention more particularly referred to later.

Briefly and in general it may be stated that the invention consists in a process of treating ores by bromin and the subsequent recovery of the bromin in which the excess of bromates or all or any part of such bromates are reduced to bromids by the addition of a reducing agent to the alkali solution containing the bromin.

The bromination process for the treatment of ores for gold is usually carried out as follows: The ore with water is treated in barrels or vats by aqueous bromin or a solution of bromin in an alkali. Also the bromin is sometimes used in conjunction with chlorin. These methods are usually applied in acid solutions. This application of the bromin in various forms dissolves the gold. The solution bearing the gold and bromin is leached from the ore and subsequently treated for the recovery of the bromin as well as the gold contained therein. Owing to the considerable quantities of lime, alumina, and other soluble materials in most gold ores and the fact that the bromin attacks and dissolves them as well as the gold, and thus loses further dissolving power, a comparatively large quantity of bromin is necessary to have a sufficient excess of this solvent to completely dissolve the gold.

Bromin, being expensive, must be recovered for use over and over again to make the process commercial. This recovery is effected in two steps:

*First. Liberation of the combined bromin.*—The bromin that is combined with the soluble constituents of the ore as bromids is subjected to chlorin, whereby a displacement of the bromin for chlorin in the compound occurs, resulting in freeing the bromin. This operation may be applied to the solution either in the presence of the ore or after the separation of the ore and solution.

*Second. Recovery of the bromin.*—After the bromin is liberated as described under No. 1 the solution bearing this bromin is either heated to evolve the bromin or air is blown through it to carry the bromin out. In either case the bromin is conducted into the presence of an alkali, which absorbs it, forming, supposing caustic soda is used, sodium bromate ($NaBrO_3$) and sodium bromid, ($NaBr$.) The original solution is then treated for the gold it contains.

Description of bromate formation:

*First. In treatment of ore.*—When ore is treated with a solution of bromin absorbed in an alkali, the bromin exists in the form of bromate and bromid. When this salt is in the following proportions, $5NaBr + NaBrO_3$, all the bromin is liberated upon the addition of an acid. If the $NaBrO_3$ is in excess of this proportion, the bromin in this excess is lost. Chlorin readily liberates bromin from bromids, but does not form bromate in either an acid or alkali solution. In the latter case it forms bromates from bromids when present.

In case chlorin is used in conjunction with bromin in ore treatment two independent chemical reactions occur simultaneously: (*a*) The chlorin acts on the bromids, forming chlorids and liberating the bromin. (*b*) The acid acts on the bromids and bromates to the extent of the following equation:

$$5NaBr + NaBrO_3 + 3H_2SO_4 = 3Na_2SO_4 + 3H_2O + 6Br.$$

As the bromin when recovered in solution is in the form of $5NaBr + NaBrO_3$ and the chlorin, as described under a, destroys much of the NaBr, forming NaCl and free bromin, the result of the two reactions is a large excess of bromate, which has heretofore been lost. This loss I prevent by my invention.

Second. *In the recovery of the bromin.*—In the treatment of solution by chlorin for the liberation of the bromin an excess of chlorin is necessary. Where the bromin is blown or driven out of the solution by heat, this excess of chlorin passes out and is absorbed in the alkali with the bromin. The bromin alone coming in contact with the alkali would form $5NaBr + NaBrO_3$, and would therefore all be liberated by an acid; but the chlorin has a further oxidizing effect, converting much of the NaBr into $NaBrO_3$, thereby occasioning another great loss in bromin. This loss I also prevent in my invention.

As above stated, my invention relates particularly to the overcoming of this loss of bromin in bromates, as follows: After the recovery of the bromin in an alkali solution I apply to the solution any reducing agent that has the power to decompose the bromates, converting them into bromids. Among these reducing agents the following may be mentioned as examples: gases—hydrogen sulfid, sulfurous acid, or hydrogen; salts—ferrous sulfate, sodium hyposulfite; metal—aluminium. Analysis of the solution for bromate may be quickly made and the exact quantity of reducing agent applied to reduce the bromates to the required proportion.

If the ore is to be treated without the use of chlorin, in the treatment, the bromates should be reduced to correspond to the equation $5NaBr + NaBrO_3$. Then all the bromin will be liberated by acid. If the ore is to be treated with bromin and chlorin in conjunction, the bromates should be reduced much lower than above. This reduction would depend on the quantity of chlorin used and how it is applied. In any case should the reduction of all the bromate to bromid be made and the ore treated with an excess of chlorin a complete liberation and recovery of all bromin used will result.

In case hydrogen sulfid is used as the reducing agent for the reduction of the bromate the reaction would probably be substantially as follows:

$$4NaBrO_3 + 3H_2S = 3H_2SO_4 + 4NaBr.$$

Having thus described my invention, what I claim as new, and desire to secure by Letters Patent, is—

1. In the treatment of ore by bromin and the subsequent recovery of the bromin, the process of reducing the bromates formed in alkali solutions to bromids, which consists in adding a reducing agent to the alkali solution containing the bromin; substantially as described.

2. In the treatment of ore by bromin and the subsequent recovery of the bromin, the process of reducing the bromates formed to bromids, by the addition to the bromates of hydrogen sulfid; substantially as described.

In testimony whereof I affix my signature in presence of two witnesses.

CLAUDE D. GROVE.

Witnesses:
R. K. HOLLAND,
GEORGIE CRANE.